United States Patent Office 2,950,941
Patented Aug. 30, 1960

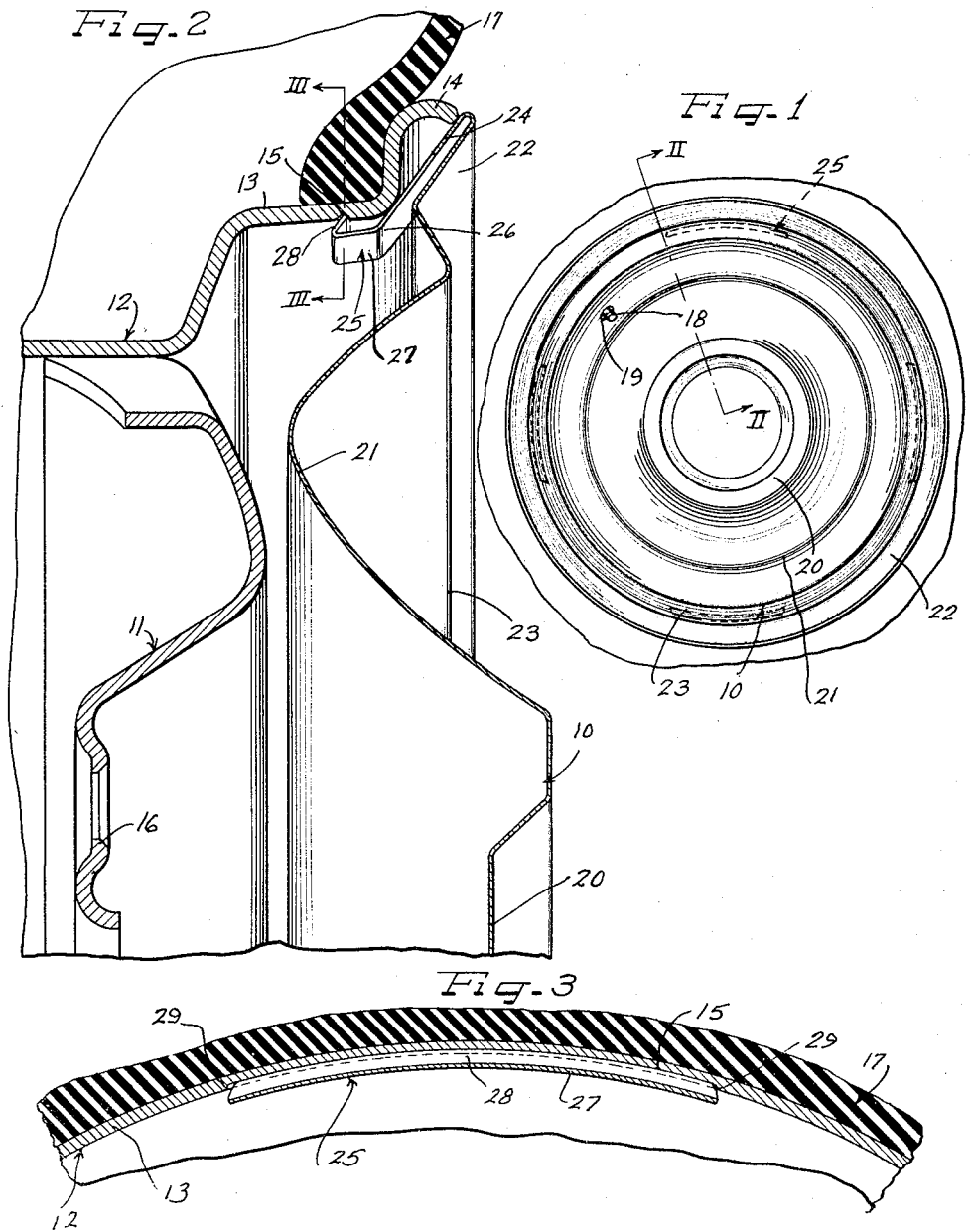

2,950,941

WHEEL COVER

George Albert Lyon, 13881 W. Chicago Blvd., Detroit 28, Mich.

Filed Dec. 12, 1956, Ser. No. 627,862

1 Claim. (Cl. 301—37)

This invention relates generally to wheel structures and more particularly to an ornamental wheel cover member for overlying protective retained disposition upon the outer side of a vehicle wheel.

An important object of this invention is to provide a wheel cover member having new and improved means for maintaining the cover member in detachable interlocked assembly upon a vehicle wheel.

Still another object of this invention is to provide a new and improved wheel cover member which lends itself to economical manufacture on a large production basis and which is adapted to efficiently co-act with a vehicle wheel in the maintenance of the cover in detachable assembly upon the wheel.

According to the general features of this invention there is provided in a wheel structure, a wheel including rim and body parts with an intermediate rim flange having circumferentially spaced arcuated grooved rim portions providing arcuate shoulders, a wheel cover section for overlying assembly upon the wheel including an outer marginal portion which is underturned generally opposite the outer margin of the tire rim providing an annular underturned portion at the underside of the cover, resiliently deflectable retaining extensions connected to said annular underturned portion each including a first generally radially and axially inwardly extending portion which is in turn connected at its radially and axially inner end to an elongated generally axially inwardly extending resiliently deflectable intermediate flange, the intermediate flange terminating in a short stiff return bent terminal which terminal has an arcuate edge for engagement in one of the arcuate grooved portions to hold the wheel cover section on the wheel in interlocked assembly.

Other objects and features of the present invention will more fully become apparent in view of the following detailed description taken in conjunction with the accompanying drawings illustrating therein a single embodiment and in which:

Figure 1 is a side elevation of my wheel structure;

Figure 2 is an enlarged fragmentary cross-sectional view taken substantially on the line II—II of Figure 1 looking in the direction indicated by the arrow; and Figure 3 is an enlarged cross-sectional view taken substantially on the line III—III of Figure 2 looking in the direction indicated by the arrow.

A wheel cover 10 according to the present invention is constructed and arranged to be applied in press-on, pry-off relation to the outer side of the vehicle wheel which may be of the conventional type having a disk spider wheel body 11 carrying a multi-flange drop center tire rim 12 which rim has a generally radially outwardly extending intermediate flange 13 terminating in an outer rim margin 14. The intermediate rim flange is provided with circumferentially spaced grooves 15 defining axially inwardly facing arcuate shoulders each of which is generally arcuate in a circumferential direction. The shoulders are formed from the metal of the rim and inclined in a radially outwardly axially inwardly direction.

The body part 11 is adapted to be bolted onto the axle of a vehicle wheel in a conventional manner, such as by directing lugs through wheel openings 16 in the body part and thereafter threading nuts onto the lugs to clamp the body part to the axle.

The tire rim is adapted to support a pneumatic tire and tube assembly, or a tubeless tire 17 as is shown in Figure 2. For inflating the tire, the tire is provided with a valve stem 18 which extends through cover opening 19 as is shown in Figure 1 so as to be accessible from the outer side of the wheel.

The wheel cover 10 comprises a one piece sheet metal stamped and drawn circular body having a central crown portion 20 for overlying a central portion of the wheel body 11 and merging with an intermediate annular inwardly dished portion 21 from which extends generally radially and axially outwardly an outer annular marginal portion 22 for overlying the tire rim 12. At the junction of the portions 21 and 22 is provided an axially outwardly bulged reinforcing rib 23 which is disposed generally opposite the retaining means.

The outer margin 22 is underturned to provide a continuous annular generally radially and axially inwardly extending annular portion 24.

New and improved means are provided for press-on pry-off retention of the cover on the wheel. To this end, the underturned outer marginal portion 24 has integrally formed therewith resiliently deflectable circumferentially spaced retaining extensions 25. Each of the extensions includes a generally radially and axially inwardly extending portion 26 which is connected at its radially and axially inner end to an elongated intermediate resiliently deflectable axially inwardly extending flange portion 27. Disposed at the axially inner end of the flange portion 27 is a return bent short stiff terminal 28 which has an edge which is adapted to engage in edgewise relation behind one of the arcuate metal shoulders provided by the grooves 15 provided on the tire rim.

When the extensions 25 are in retaining cooperation behind the shoulders provided by the grooves 15, circumferentially spaced and circumferentially facing side edges or shoulders 29 are adapted to abut against the sides of the rim grooves to resist circumferential slippage of the terminal 28 with respect to the rim. It will also be noted from Figure 2 that the terminal 28 has its arcuate edge disposed in a plane positioned generally at a right angle to the metal rim shoulder defined by the rim groove 15 in biting engagement thereagainst.

The cover may be assembled with respect to the wheel by initially aligning the valve stem 18 with respect to the cover opening 19, then upon the application of an axially inward force, the short stiff terminal 28 may be caused to be biased as it is cammed along the intermediate rim flange 13 until it snaps behind the shoulder provided by the groove 15 in the intermediate flange 13. It will be appreciated, the extensions 25 and the rim grooves 15 may be aligned with respect to one another by means of the alignment developed by centering and inserting the valve stem through the cover opening.

Any suitable number of retaining extensions 25 may be provided although it will be appreciated four or more of the extensions will be adequate.

When the cover is in assembly upon the wheel the underturned annular portion 24 is bottomed against the terminal rim flange 14 so as to provide a positive abutment so that if impact forces developed in curbing and the like are directed against the outer margin of the cover the retaining means will not be readily dislodged nor distorted with respect to the tire rim.

The cover may be removed from the wheel by mounting between the cover and the tire rim a pry-off tool and upon exerting a pry-off force the cover may be ejected from the wheel.

It will be understood that modifications and variations may be effected without departing from the spirit and scope of the novel concepts of the present invention.

I claim as my invention:

In a wheel structure, a wheel including a metal multi-flanged stepped tire rim provided with an axially extending terminal rim flange and an intermediate rim flange and with the intermediate rim flange having circumferentially spaced arcuate grooved rim portions providing circumferentially spaced axially inwardly facing metal rim shoulders with each of the shoulders having a pair of circumferentially spaced and circumferentially facing confronting groove and shoulders, a wheel cover member for overlying assembly upon the wheel including an outer marginal cover portion which is underturned providing an annular portion at the underside of the cover which is bottomed against the axially extending terminal rim flange, resiliently deflectable retaining extensions connected to said underturned portion each including a first generally radially and axially inwardly extending extension portion projecting from the annular portion at the underside of the cover inwardly to a diameter slightly greater than the inside diameter of the intermediate flange, the radially and axially inwardly extending extension portion being connected at its radially and axially inner end to a generally axially inwardly extending resiliently deflectable intermediate extension flange generally telescopically related in spaced relation to the intermediate flange, said intermediate extension flange terminating in a short stiff return bent generally axially and radially outwardly oblique extension terminal which terminal has an arcuate edge, said arcuate edge being engaged with the circumferentially spaced arcuate grooved rim portions behind said axially inwardly facing metal rim shoulders and each of said arcuate edges being disposed between one of the pairs of circumferentially spaced end shoulders to hold the wheel cover member on the wheel against turning, the bottomed engagement of the outer marginal cover portion against the axially extending terminal rim flange and the engagement of the arcuate edges on the extension behind the axially inwardly facing metal rim shoulders preventing axial displacement of the cover member.

References Cited in the file of this patent

UNITED STATES PATENTS

| | | |
|---|---|---|
| Re. 19,466 | Lyon | Feb. 12, 1935 |
| 2,631,066 | Horn | Mar. 10, 1953 |
| 2,669,487 | Horn | Feb. 16, 1954 |
| 2,690,358 | Lyon | Sept. 28, 1954 |
| 2,693,984 | Lyon | Nov. 9, 1954 |